(12) United States Patent
Prozzi et al.

(10) Patent No.: US 10,688,897 B2
(45) Date of Patent: Jun. 23, 2020

(54) INTEGRATED BLADELESS FAN FOR AUTOMOTIVE SEAT

(71) Applicant: Ford Global Technologies, LLC, Dearborn, MI (US)

(72) Inventors: Anthony Prozzi, Menlo Park, CA (US); Tyler Carpenter, San Francisco, CA (US); Jeremy John Malick, Menlo Park, CA (US); Nicolas Thetard, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/115,652

(22) Filed: Aug. 29, 2018

(65) Prior Publication Data

US 2019/0092196 A1  Mar. 28, 2019

Related U.S. Application Data (60) Provisional application No. 62/563,509, filed on Sep. 26, 2017.

(51) Int. Cl.
| | |
|---|---|
| *B60N 2/56* | (2006.01) |
| *B60N 2/879* | (2018.01) |
| *B60N 2/68* | (2006.01) |
| *B60N 2/64* | (2006.01) |
| *B60N 2/70* | (2006.01) |

(52) U.S. Cl.
CPC ......... *B60N 2/5657* (2013.01); *B60N 2/5635* (2013.01); *B60N 2/5685* (2013.01); *B60N 2/879* (2018.02); *B60N 2/64* (2013.01); *B60N 2/68* (2013.01); *B60N 2/70* (2013.01)

(58) Field of Classification Search
CPC .. B60N 2/5657; B60N 2/5621; B60N 2/5685; B60N 2/5635; B60N 2/879; B60N 2/68; B60N 2/64; B60N 2/70
USPC ...................................................... 297/180.14
See application file for complete search history.

(56) References Cited

U.S. PATENT DOCUMENTS

| | | | | |
|---|---|---|---|---|
| 7,837,270 | B2 * | 11/2010 | Eriksson ............... | B60N 2/5635 297/180.14 |
| 8,201,203 | B2 * | 6/2012 | Vitito ..................... | B60N 2/879 725/75 |
| 9,139,118 | B2 * | 9/2015 | Berroth ................ | B60N 2/5635 |

(Continued)

FOREIGN PATENT DOCUMENTS

| | | |
|---|---|---|
| CN | 201982331 U | 9/2011 |
| CN | 202165291 U | 3/2012 |

(Continued)

*Primary Examiner* — Milton Nelson, Jr.
(74) *Attorney, Agent, or Firm* — David Coppiellie; Price Heneveld LLP (57) ABSTRACT

A seating assembly includes a seatback defining an enlarged elongate vertical aperture. A bladeless fan is disposed in the elongate vertical aperture. The bladeless fan includes a base with an air mover disposed therein. A bladeless air loop is in fluid communication with the base. An open lattice cushion support is disposed on the seatback. The open lattice cushion support is exposed from a rear portion of the seatback and is configured to allow air from the bladeless fan to move from a rearward portion of a seat, through the open lattice cushion support and into contact with an occupant resting against the seatback.

19 Claims, 8 Drawing Sheets

(56) References Cited

U.S. PATENT DOCUMENTS

| | | | | |
|---|---|---|---|---|
| 2010/0011502 A1* | 1/2010 | Brykalski | ............ | A47C 21/044 5/423 |
| 2013/0140857 A1* | 6/2013 | Shin | .................... | B60N 2/5657 297/180.13 |
| 2013/0264396 A1* | 10/2013 | Roe | ........................ | B05B 12/04 239/11 |
| 2014/0179212 A1* | 6/2014 | Space | .................... | B60N 2/565 454/76 |

FOREIGN PATENT DOCUMENTS

| | | | | |
|---|---|---|---|---|
| CN | 105822592 A | | 8/2016 | |
| DE | 102005007478 A1 | * | 9/2005 | ........... B60N 2/5614 |
| JP | 2016164028 A | * | 9/2016 | ............. B60N 2/565 |
| WO | WO-02053400 A2 | * | 7/2002 | ......... B60H 1/00285 |
| WO | WO-2014103219 A1 | * | 7/2014 | ......... B60H 1/00285 |

\* cited by examiner

INTEGRATED BLADELESS FAN FOR AUTOMOTIVE SEAT

CROSS-REFERENCE TO RELATED APPLICATION

This application claims priority to and the benefit under 35 U.S.C. § 119(e) of U.S. Provisional Application No. 62/563,509, filed on Sep. 26, 2017, entitled "INTEGRATED BLADELESS FAN FOR AUTOMOTIVE SEAT," the disclosure of which is hereby incorporated herein by reference in its entirety.

FIELD OF THE DISCLOSURE

The present disclosure generally relates to an automotive seat, and more particularly to an integrated bladeless fan for an automotive seat.

BACKGROUND OF THE DISCLOSURE

Cooling systems are an important consideration for the inside of cars in order to keep the occupants, in particular the driver of the vehicle comfortable. However, current automotive cooling systems are expensive, heavy and require ducting and registers throughout a vehicle. The registers require a user to position the airflow. Presently, if cool air is desired, the fan must be turned on, the thermostat temperature lowered, and then the occupant must try to direct one or more ducts such that the air being blown out intersects the body of the occupant in the hope of cooling down. Depending on the direction of the ducts, turning the power level of the fan up causes the air to rush even faster into the face of the occupant. If the occupant has long strands of hair, the hair can blow into the eyes of the occupant. Depending upon the time of year, the flow of air directed towards the face and eyes adds additional discomfort in terms of drying the eyes, and potentially directly pollen or other such allergy-related particles into the eyes. In addition, it can be very difficult to direct air flow in a desired direction to cool the core of a occupant's body or torso. Furthermore, other occupants can be highly affected by the air movement, thereby frustrating adjacent occupants. Given the strides that technology has taken over the years, a more elegant solution to this general problem would be useful.

SUMMARY OF THE DISCLOSURE

According to one aspect of the present disclosure, a seating assembly includes a seatback defining an enlarged elongate vertical aperture. A bladeless fan is disposed in the elongate vertical aperture. The bladeless fan includes a base with an air mover disposed therein. A bladeless air loop is in fluid communication with the base. An open lattice cushion support is disposed on the seatback. The open lattice cushion support is exposed from a rear portion of the seatback and is configured to allow air from the bladeless fan to move from a rearward portion of the seatback, through the open lattice cushion support and into contact with an occupant resting against the seatback.

According to another aspect of the present disclosure, a seating assembly includes a frame supporting a seat and a seatback. A bladeless fan is disposed in the seatback. The bladeless fan includes a base with an air mover disposed therein. A bladeless air loop is in fluid communication with the base. An open lattice cushion support is disposed on the seatback and is configured to allow air from the bladeless fan to move from a rearward portion of the seatback, through the open lattice cushion support and into contact with an occupant.

According to yet another aspect of the present disclosure, a seating assembly includes a frame supporting a seat and a seatback. A bladeless fan is disposed in at least one of the seat and the seatback. An open lattice cushion support is disposed on at least one of the seat and the seatback and is configured to allow air from the bladeless fan to move from a rearward portion of the frame, through at least one of the seat and the seatback and into contact with an occupant.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
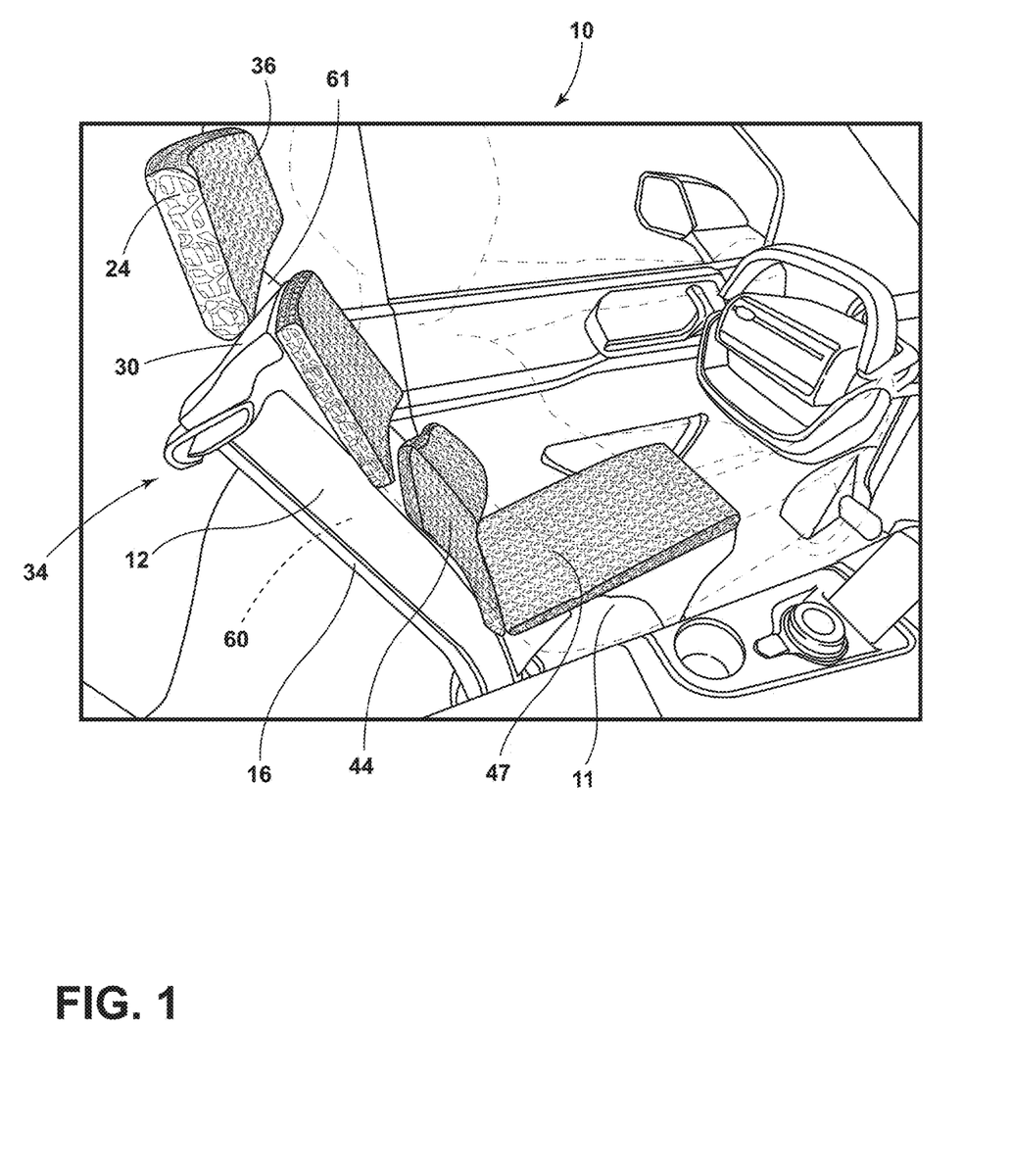
FIG. 1 is a side perspective cross-sectional view of a seating assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-7A, reference numeral 10 generally designates a seating assembly, which may be a stand-alone seating assembly, or an automotive seating assembly. The seating assembly 10 includes a seat 11 and a seatback 12 defining an enlarged elongate vertical aperture 14. A bladeless fan 16 is disposed in the elongate vertical aperture 14. The bladeless fan 16 includes a base 18 with an air mover 20 disposed therein. A bladeless air loop 22 is in fluid communication with the base 18. An open lattice cushion support 24 is disposed on the seatback 12. The open lattice cushion support 24 is exposed from a rear portion of the seatback 12 and is configured to allow air from the bladeless fan 16 to move from a rearward portion of the seatback 12, through the open lattice cushion support 24 and into contact with an occupant resting against the seatback 12.

Figure 2:
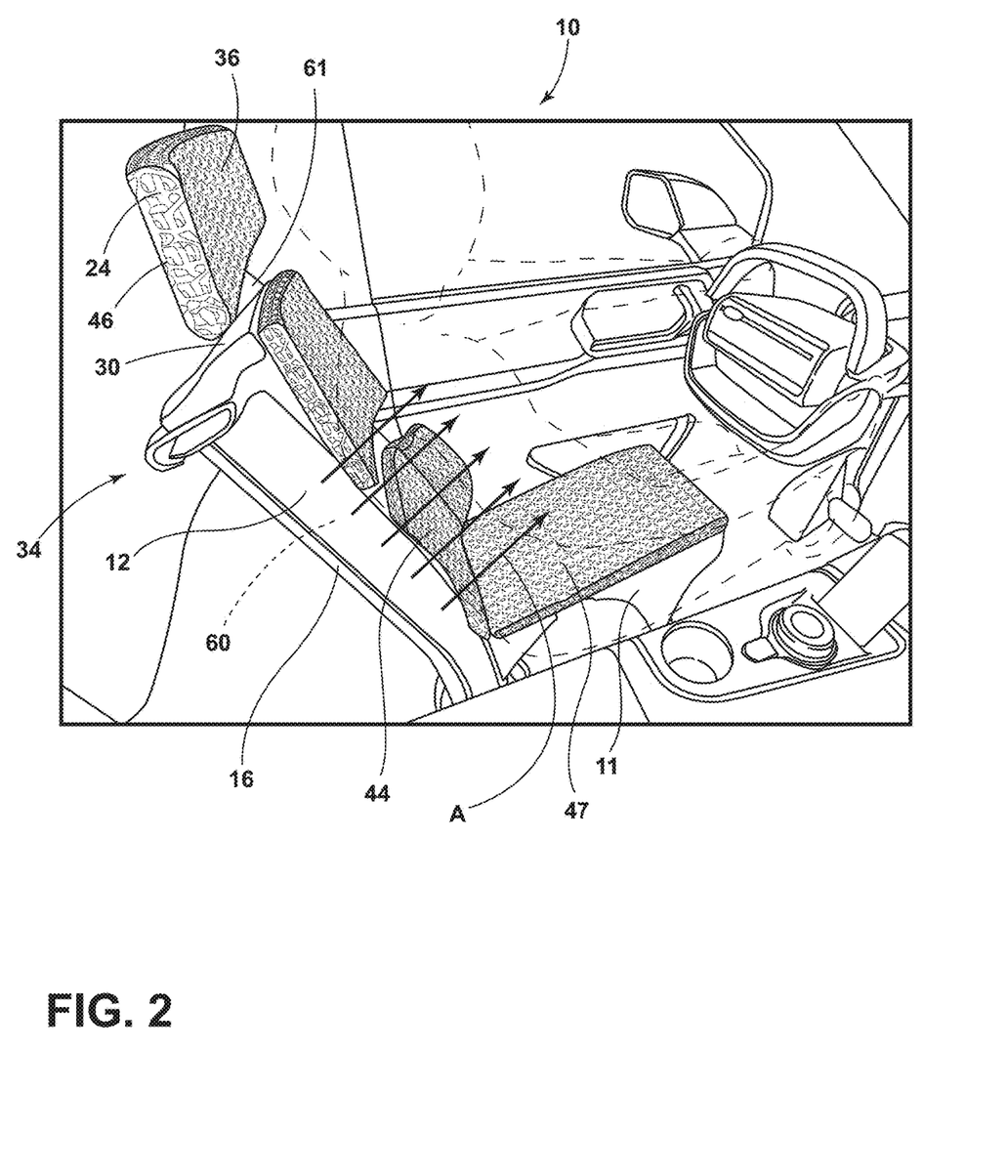
FIG. 2 is a side perspective cross-sectional view of the seating assembly of FIG. 1 illustrating air flow.

Referring to FIGS. 1 and 2, the seating assembly 10 includes a frame 30, the open lattice cushion support 24 (with an optional permeable covering or trim stock 32) and the bladeless fan 16, which, together generally defines a seating climate control system 34. In this configuration, air drawn in from the base 18 is directed to the body of an occupant through the seat 11 or the seatback 12, from below or, respectively, behind, and therefore overcomes several of the disadvantages identified above. In addition, the air is directed in the direction of arrows A toward the torso of the occupant seated in the seating assembly 10, thereby cooling the core of the occupant and providing an efficient cooling mechanism without any moving parts.

With reference again to FIGS. 1 and 2, the frame 30 is configured for installation in a vehicle such as a car, truck, van, etc. However, it will be understood that the seating assembly 10 in the frame 30 may be installed in any location where thermal control of a seated occupant is desirable. It is generally contemplated that the frame 30 may be constructed from a polymer material such as high density polyethylene, fiber glass, etc. that is configured to withstand forces associated with a collision event of the vehicle. In addition, the frame 30 is generally configured to provide support to a seated occupant and at the same time providing comfort to the occupant thereby creating comfort over long periods of travel. The frame 30 may be positioned anywhere inside the vehicle including a driver's seat, passenger's seat, or rear seats. In addition, it is contemplated that the seating assembly 10 may be adjusted utilizing standard controls that are available on the dash or sides of the seatback 12 or seat 11. In addition, it is generally contemplated that the climate comfort system of the seating assembly 10 may work in concert with a climate control system of the vehicle. More specifically, adjustments made to the climate control system of the vehicle may work in synchronization with climate adjustments of the seating assembly 10. Alternatively, the seating assembly 10 may be operated independently of any climate control system within the vehicle.

With reference again to FIGS. 1 and 2, the illustrated seating assembly 10 also includes a headrest 36. The headrest 36 may be independent of or in fluid communication with the climate control system of the seating assembly 10. It is also contemplated that the headrest 36 may include a similar open lattice cushion support 24 as that disposed on the seatback 12. Alternatively, as a result of the headrest 36 being positioned further from the bladeless fan 16, the headrest 36 may include an open lattice having larger spaces that allows for even more air flow through the headrest 36.

The headrest 36 may be adjustable relative to the seatback 12, and removable therefrom. More specifically, the headrest 36 may be operably coupled with an opening 37 defined in a top portion 38 of the seatback 12. In addition, it is generally contemplated that the headrest 36 may be adjusted such that the headrest 36 is closed off from cooling. For example, internal gates 39 (FIG. 5) may be provided that limit or prohibit air flow between the bladeless fan 16 and the headrest 36. This functionality would be utilized when an occupant chooses to cool the seat 11 or seatback 12, but not the headrest 36 of the seating assembly 10.

Figure 3:
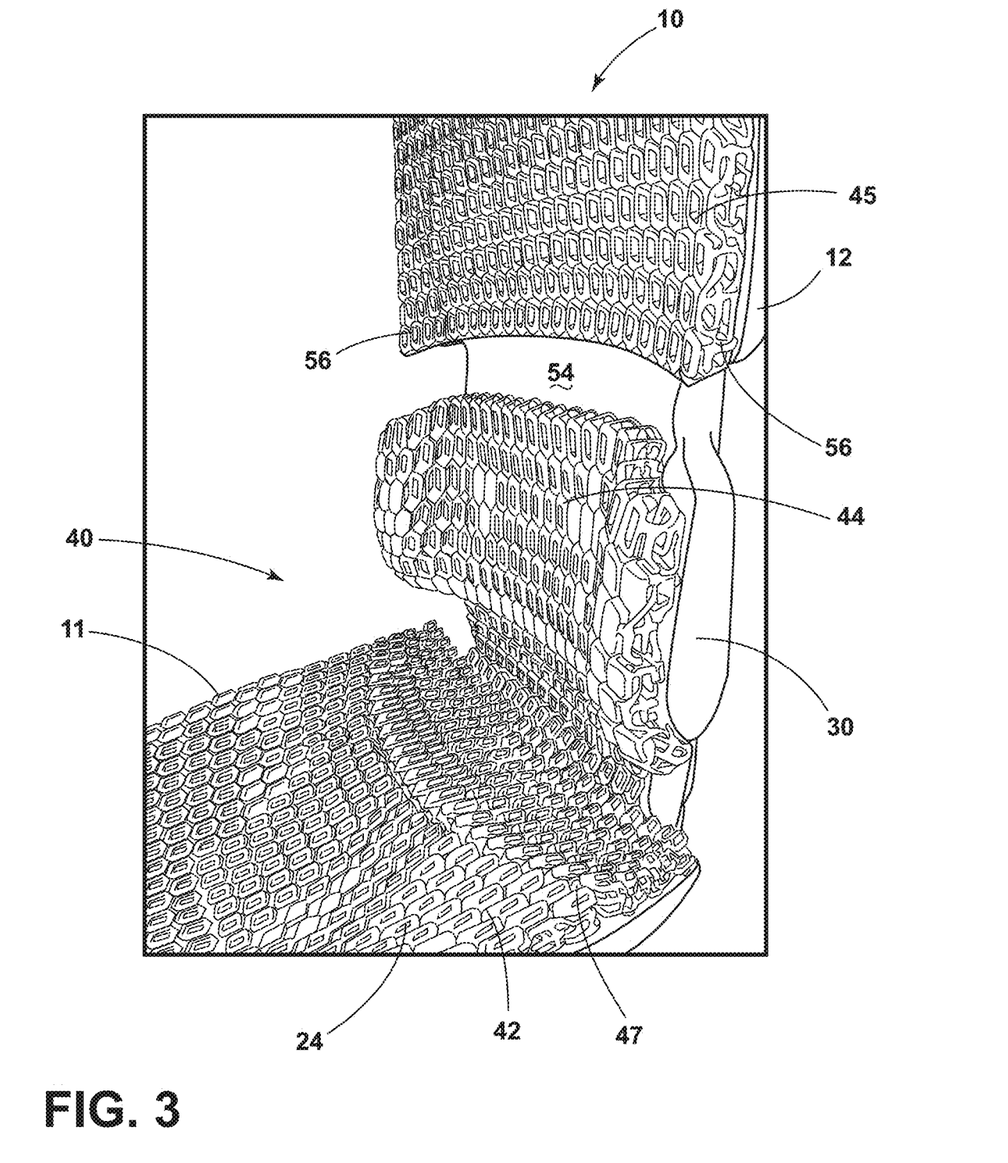
FIG. 3 is a side perspective view of a seating assembly of the present disclosure.
Figure 4:
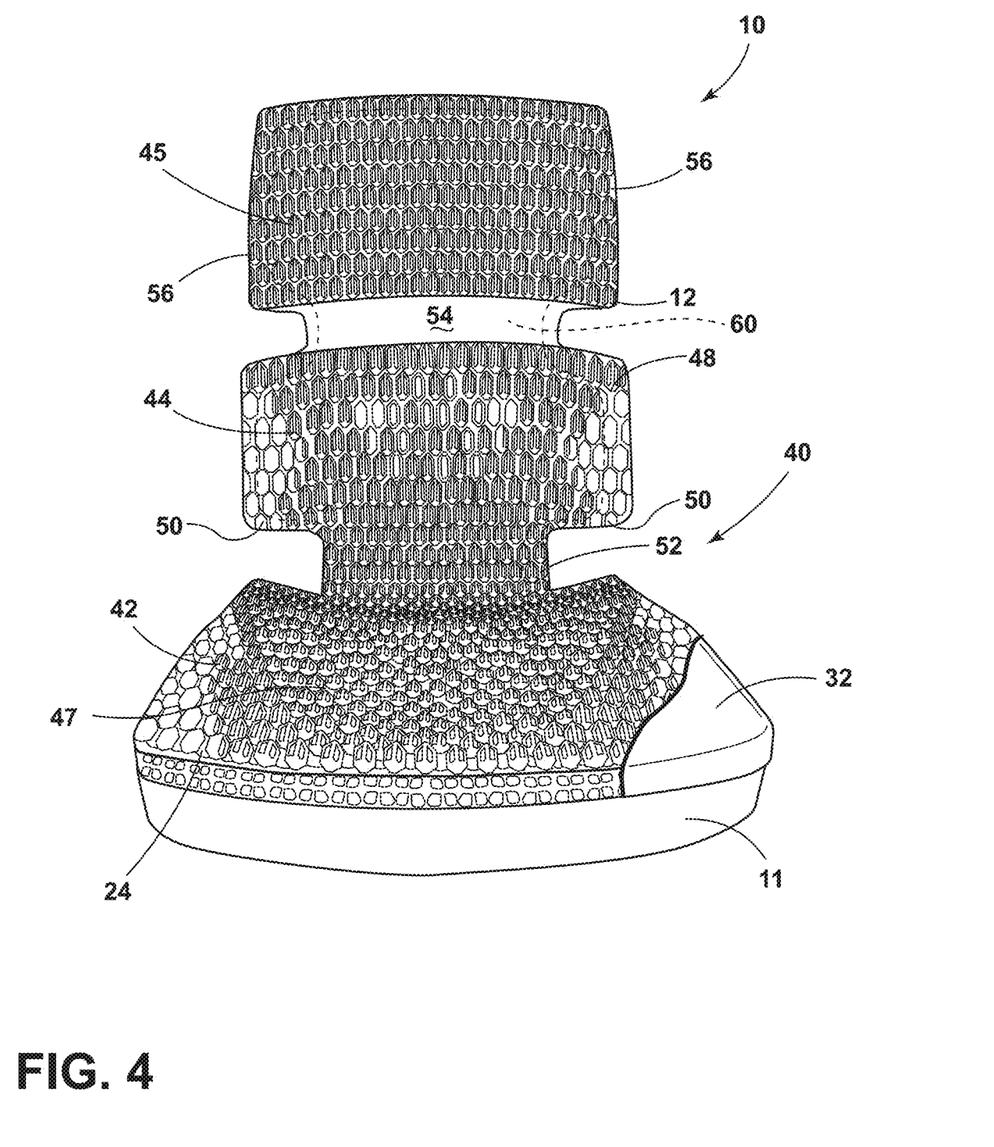
FIG. 4 is a front perspective view of the seating assembly of FIG. 3.
Figure 5:
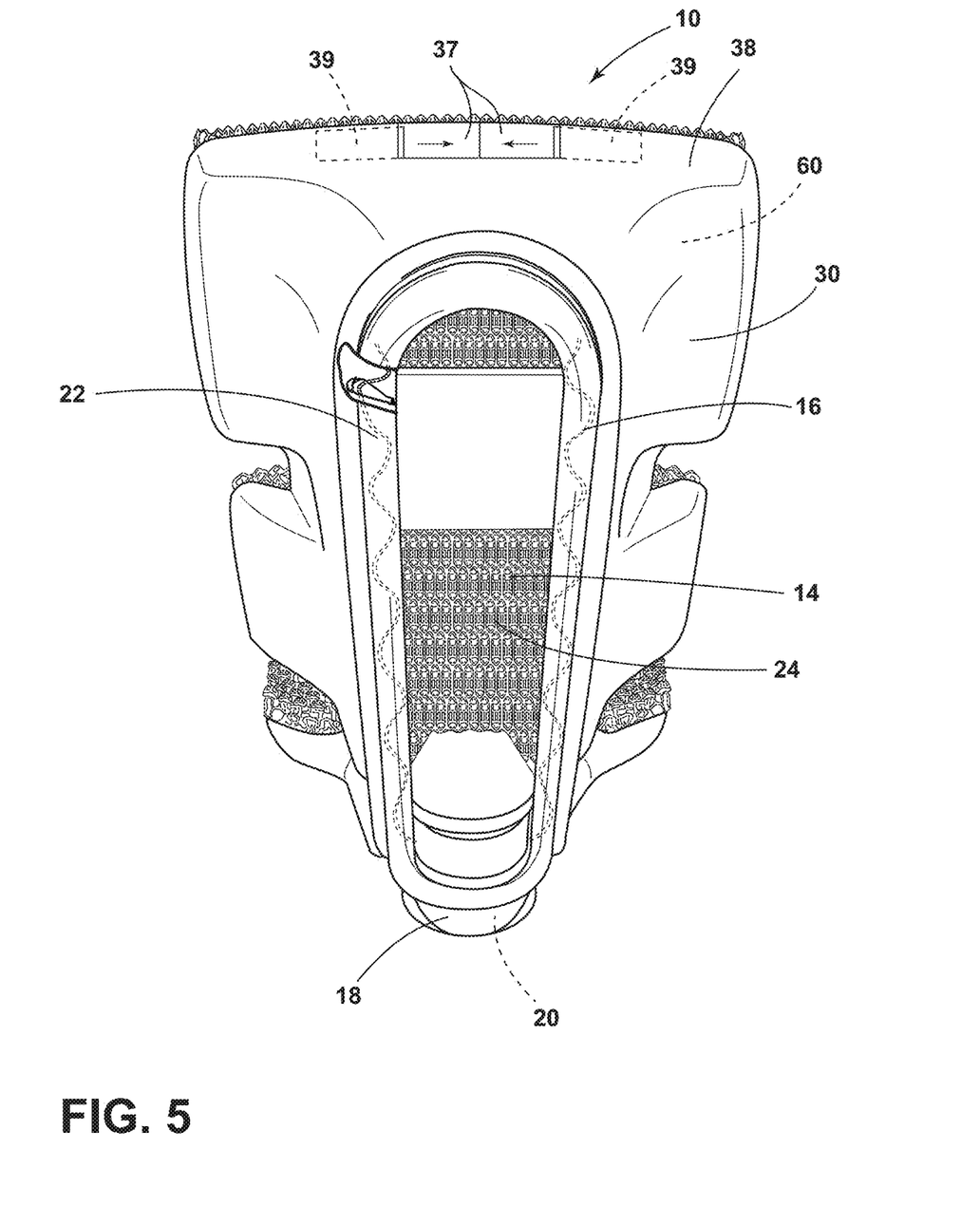
FIG. 5 is a rear perspective view of the seating assembly of FIG. 3.
Figure 6:
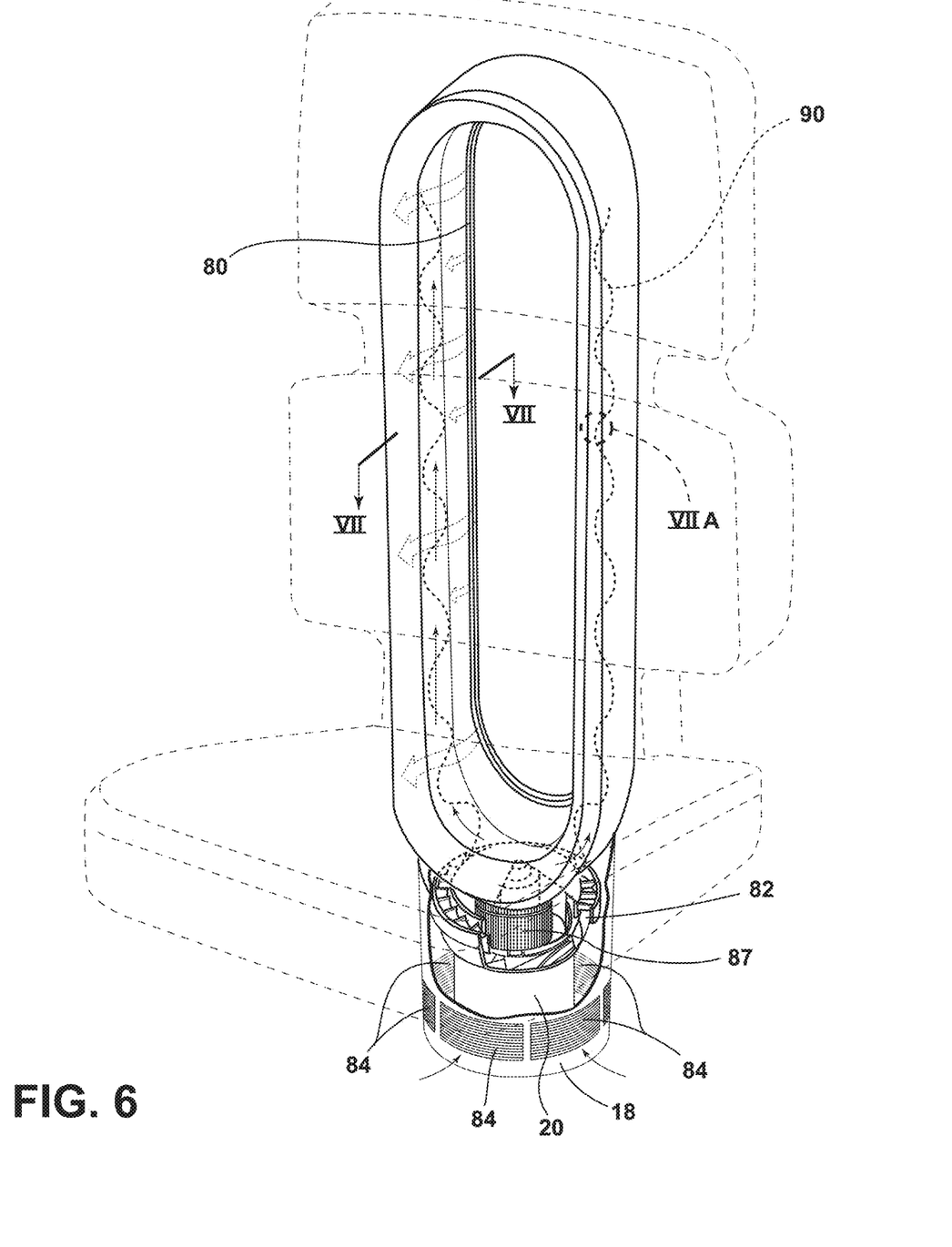
FIG. 6 is a side perspective view of a seating assembly of the present disclosure with the seat and seatback in phantom showing a bladeless fan assembly therein.
Figure 7:
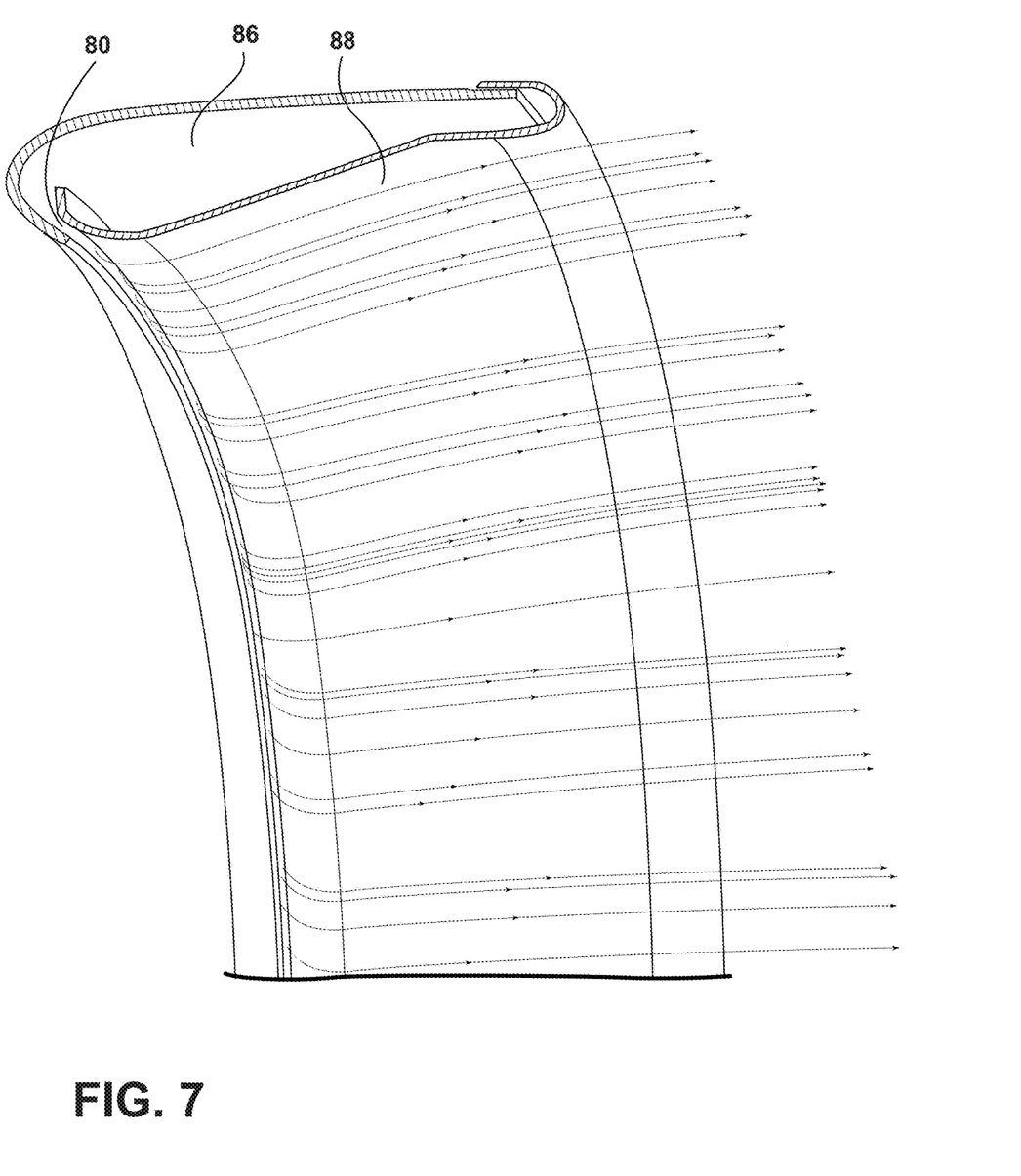
FIG. 7 is a side perspective cross-sectional view of a bladeless fan of the present disclosure.
Figure 7A:
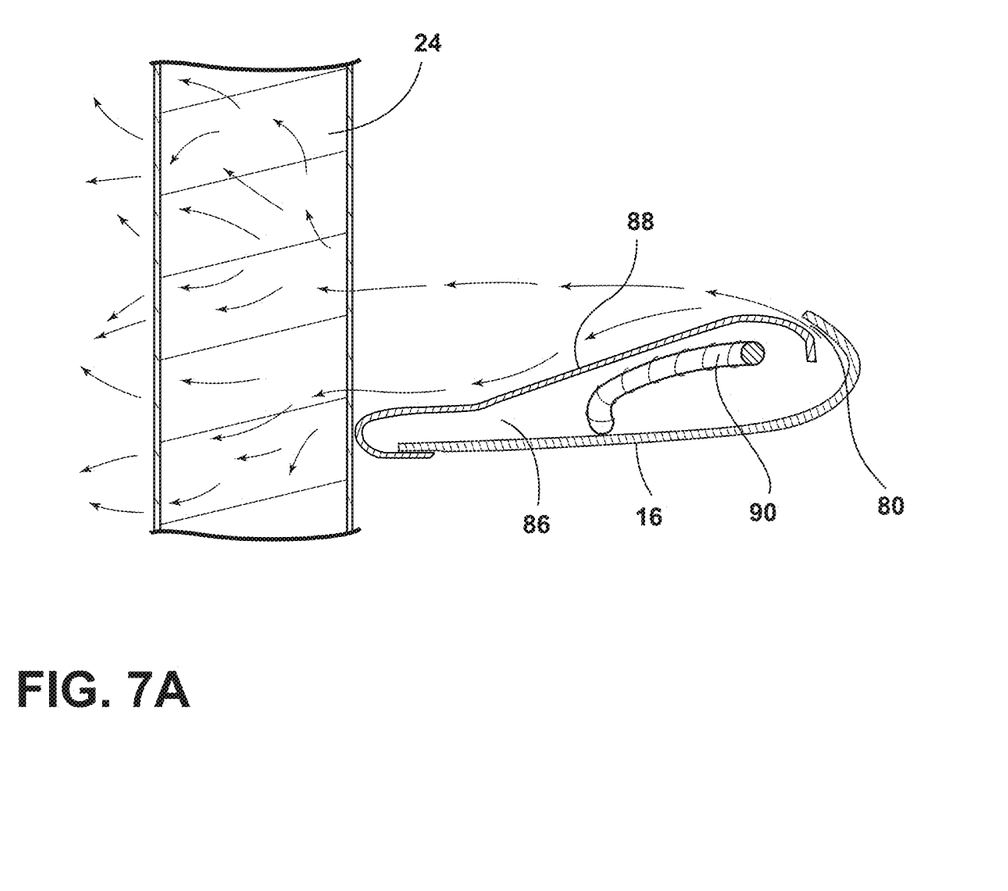
FIG. 7A is a top cross-sectional view of a bladeless fan with a heating coil disposed therein.

Referring now to FIGS. 3-5, the components of the seating assembly 10 are shown in more detail. The frame 30 of the seating assembly 10 supports cushion elements 40 that are configured to support the occupant. The cushion elements 40 typically include a seat portion 42 disposed on the seat 11, a lumbar portion 44, a thoracic portion 45 disposed on the seatback 12, and a headrest portion 46 (FIG. 2) disposed on the headrest 36 above the seatback 12. In some configurations, the cushion elements 40 may be integrated into one unitary element. As illustrated, the seat portion 42 and lumbar portion 44 are integrally formed as one piece. However, the seat portion 42 and lumbar portion 44 could be separated. The thoracic portion 45 is spaced and separate from the headrest 36 and the lumbar portion 44. As illustrated in FIG. 5, the frame 30 defines the elongate vertical aperture 14 in the seatback 12, the elongate vertical aperture 14 defining the location of the bladeless fan 16. More specifically, the bladeless fan 16 is disposed around the elongate vertical aperture 14. As shown in FIGS. 3 and 4, the seat portion 42 of the cushion elements 40 includes a widened support surface 47 configured to support the buttocks of a seated occupant. The lumbar portion 44, however, includes an upper area 48 that is widened and which includes opposing side bolsters 50. A lower area 52 of the lumbar portion 44 is narrower proximate the hips of a seated occupant. It is generally contemplated that this lower area 52 is in less need of cooling when the occupant is seated.

With reference again to FIGS. 3 and 4, the upper area 48 of the lumbar portion 44 is spaced from the thoracic portion 45. However, both the thoracic portion 45 and lumbar portion 44 are connected by an intermediate area 54 that is free of the open lattice cushion support 24. However, the thoracic portion 45 includes wings 56 that extend laterally from sides of the upper thoracic portion 45. The seatback 12 defines a cavity 60 through which air flows through the seatback 12. The wings 56 extend the open cavity 60 laterally so air can be blown toward a seated occupant proximate the shoulders of the seated occupant. The headrest 36 is disposed above the thoracic region and may be in fluid communication with the bladeless air loop 22. However, it is also contemplated that the gates 39 may be disposed within the cavity 60 and can be opened to increase air flow from the bladeless fan 16 to the headrest 36 or closed to lessen or eliminate air flow from the bladeless fan 16 to the headrest 36. As illustrated in FIG. 5, the opening 37 may be positioned at a top of the seatback 12 and configured to receive an extension 61 of the headrest 36.

With reference now to FIGS. 5-7A, the seating assembly 10 is configured so that the base is disposed below the seat 11, possibly mounted on a floor of the vehicle. The air mover 20 may include a motor that is configured to draw air in through air intake apertures 84 defined in the base. The air mover 20 includes a cyclone accelerator 82 that forces air up into the bladeless fan 16. The cyclone accelerator 82 forces the air through a filter 87 and upward into the bladeless fan 16, which includes a forward slit 80. The slit 80 is directed forward toward the open lattice cushion support 24.

With reference again to FIGS. 5-7A, operation of the seating climate control system 34 will be addressed in greater detail. As previously noted, the bladeless fan 16 is located about the elongate vertical aperture 14, and integrated within the frame 30. The frame 30 may be constructed from a single piece of material or may include several components fastened together. Importantly, the frame 30 defines the internal cavity 60 through which air is pushed by the base 18. As the cavity 60 fills, the air is forced outward in a forward direction toward the seat 11 and/or the seatback 12 through a slit 80 disposed on an inside wall of the bladeless fan 16. The air is forced through the open lattice cushion support 24 into contact with a seated passenger. As shown in FIG. 5, a central portion of the open lattice cushion support 24 may be exposed through the seatback 12. The bladeless fan 16 includes the base 18 with the air mover 20, as well as the bladeless air loop 22, as noted above. This construction has the added benefit of providing additional support within the seatback 12. The air mover 20 draws air into the cyclone accelerator 82 of the base 18 that forces the air into a void 86 defined by the bladeless fan 16 to create a pressurized condition. The pressurized air is then forced out through the forward facing circumferential slit 80. The air follows an inner wall 88 of the bladeless fan 16 forward into the open lattice cushion support 24 and into contact with the occupant. As the air is forced out, more air is drawn into the air mover 20 through intake apertures 84, thereby allowing for increased and steady cooling of the seating surface. Although the bladeless fan 16 can be used for cooling, the bladeless fan 16 could also be used to blow air across a heated element 90 within the seating assembly 10 against the core of an occupant. As the air moves across the heated element 90, the air is warmed and pushed through the open lattice cushion support 24 and into contact with a seated occupant.

In the solution illustrated, the open lattice cushion support 24 has been manufactured by a 3D printing process, however other forms of fabrication may also be used. Additional cushion elements may be provided where necessary for added comfort of the occupant of the seating assembly 10. However it is important that any trim stock covering the opening in the frame 30 allow air to be pushed through the trim stock and toward the occupant sitting in the seating assembly 10. The trim stock will include at least some air flow capabilities so as not to limit or lessen the air flow required to implement heating or cooling.

The power source for the air mover 20 of the seating assembly 10 can be integrated into a seat base of the seating assembly 10, out of the way, and easily hidden. Conventional electrical connections can be employed to connect the bladeless fan 16 to the electrical system(s) of the vehicle, and a control for the bladeless fan 16 can be provided. The control may provide variation in fan speed, have a timer, etc. The control can be located in a place of convenience to the occupant, such as a remote unit, integrated onto an armrest, another location adjacent the seating assembly 10, or perhaps on the dashboard or steering wheel of the vehicle.

The new seat design integrates high efficiency bladeless cooling technology into vehicle seats, and forces air through the body of the occupant seated in the seat, from behind and without any moving parts. The utilization of back rest cushions which have open lattice structure, optimizes the cooling solution. By directing air directly to the torso of the occupant seated in the seating assembly, an efficient cooling mechanism is provided. This new vehicle seat design integrates high efficiency bladeless cooling technology into a seating assembly to provide heating or cooling to an occupant without any moving parts in the seat or the seatback.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A seating assembly comprising:
a seatback defining an enlarged elongate vertical aperture;
a bladeless fan disposed in the elongate vertical aperture, the bladeless fan comprising:

a base with an air mover disposed therein; and
a bladeless air loop in fluid communication with the base; and
an open lattice cushion support disposed on the seatback, the open lattice cushion support being exposed from a rear portion of the seatback and configured to allow air from the bladeless fan to move from a rearward portion of the seatback, through the open lattice cushion support and into contact with an occupant resting against the seatback.

2. The seating assembly of claim 1, wherein the open lattice cushion support has a generally consistent pattern that moves air from the bladeless fan to a seating surface of a seat.

3. The seating assembly of claim 1, wherein the bladeless air loop extends around the elongate vertical aperture from a top of the seatback to a bottom of the seatback.

4. The seating assembly of claim 1, further comprising:
a headrest spaced from the bladeless fan and including an open lattice support.

5. The seating assembly of claim 1, wherein the open lattice cushion support includes an upper thoracic portion spaced a predetermined distance from a lower lumbar portion of the open lattice cushion support.

6. The seating assembly of claim 1, further comprising:
wings that extend laterally from sides of the seatback, the wings defining an open cavity in fluid communication with the open lattice cushion support such that air is moved from the sides of the seatback.

7. The seating assembly of claim 1, further comprising:
a seat disposed below the seatback, the seat including a seat open lattice cushion support in fluid communication with the open lattice cushion support disposed on the seatback.

8. A seating assembly comprising:
a frame supporting a seat and a seatback;
a bladeless fan disposed in the seatback, the bladeless fan comprising:
a base with an air mover disposed therein; and
a bladeless air loop in fluid communication with the base; and
an open lattice cushion support disposed on the seatback and configured to allow air from the bladeless fan to move from a rearward portion of the seatback, through the open lattice cushion support and into contact with an occupant.

9. The seating assembly of claim 8, wherein the bladeless air loop is elongate and extends from a top of the seatback to a bottom of the seatback proximate the seat.

10. The seating assembly of claim 8, further comprising:
a headrest spaced from the bladeless fan and including an open lattice support.

11. The seating assembly of claim 8, wherein the open lattice cushion support includes an upper thoracic portion spaced a predetermined distance from a lower lumbar portion of the open lattice cushion support.

12. The seating assembly of claim 8, further comprising:
wings that extend laterally from sides of the seatback, the wings defining an open cavity in fluid communication with the open lattice cushion support such that air is moved from the sides of the seatback.

13. The seating assembly of claim 8, wherein the seat includes a seat open lattice cushion support in fluid communication with the open lattice cushion support disposed on the seatback.

14. A seating assembly comprising:
a frame supporting a seat and a seatback;
a bladeless fan disposed proximate of at least one of the seat and the seatback; and
an open lattice cushion support disposed on and in fluid communication with the seat and the seatback, the open lattice cushion support allowing air from the bladeless fan to move through the seat and the seatback to cool a seating surface of said seating assembly, wherein the bladeless fan defines an elongate vertical aperture in the seatback such that a central portion of the open lattice cushion support is exposed through the seatback.

15. The seating assembly of claim 14, wherein the open lattice cushion support includes an upper thoracic portion spaced a predetermined distance from a lower lumbar portion of the open lattice cushion support.

16. The seating assembly of claim 15, wherein the lower lumbar portion includes opposing side bolsters covered by the open lattice cushion support.

17. The seating assembly of claim 15, wherein the open lattice cushion support of the seat is integrally formed with the open lattice cushion support of the lower lumbar portion of the seatback.

18. The seating assembly of claim 15, further comprising:
wings that extend laterally from sides of the upper thoracic portion, the wings defining an open cavity in fluid communication with the open lattice cushion support such that air is moved from the sides of the upper thoracic portion.

19. The seating assembly of claim 14, wherein the open lattice cushion support is covered by a breathable trim stock.

* * * * *